United States Patent [19]

Turpin, Jr.

[11] 4,052,220

[45] Oct. 4, 1977

[54] METHOD OF MAKING AN IMPROVED CONCRETE

[75] Inventor: Raymond C. Turpin, Jr., Atlanta, Ga.

[73] Assignee: The Partners Limited, Atlanta, Ga.; a part interest

[21] Appl. No.: 612,138

[22] Filed: Sept. 10, 1975

[51] Int. Cl.² .............................................. C04B 7/35
[52] U.S. Cl. ...................................... 106/90; 106/92; 106/97
[58] Field of Search ................ 106/90, 97, 92, DIG. 1

[56] References Cited

U.S. PATENT DOCUMENTS

| 3,486,917 | 12/1969 | Wallis | 106/90 |
| 3,723,145 | 3/1973 | Haldas et al. | 106/90 |

*Primary Examiner*—J. Poer
*Attorney, Agent, or Firm*—Kirkland & Ellis

[57] ABSTRACT

A method for preparing an improved concrete wherein a chemical admix is slurried with water and a pozzolan material prior to its incorporation in the concrete. This method reduces the slump loss of the concrete during transportation, and increases its workability in the form at the point of use without any sacrifice in strength.

20 Claims, No Drawings

METHOD OF MAKING AN IMPROVED CONCRETE

BACKGROUND OF THE INVENTION

1. Field of the Invention

The present invention relates to concrete and specifically to ready-mixed concrete and other applications in which considerable time may elapse between the mixing of the concrete ingredients and the placement of the concrete mixture into a suitable form or mold. More particularly, the present invention concerns a method for preparing concrete containing a chemical admix wherein the chemical admix is slurried with water and a pozzolan material prior to its incorporation into the concrete mixture. The method results in a concrete which has prolonged workability.

2. Description of the Prior Art

The binding properties of cement are the results of a complex series of chemical reactions which occur primarily between its lime and silicate constituents in the presence of water. As soon as the cement and water are mixed, these chemical reactions begin. At any given time the properties of the paste, mortar, or concrete in which the cement is incorporated are significantly affected by the extent to which these chemical reactions have proceeded.

In many commercial situations the concrete ingredients, cement, fine aggregate, water, and coarse aggregate, are added to a truck at a central location and transported with or without mixing to the site where the concrete is to be used. Unfortunately, for many reasons the time between the initial mixing of the ingredients and the time when the ready-mixed concrete can be placed into the form at the point of use cannot be closely controlled. Since the cementitious reactions have already begun at the central mixing locations, if an unduly long delay occurs, the reaction may have proceeded to such an extent that the concrete lacks sufficient plasticity to be conveniently handled, and the concrete hardens too rapidly in the form to allow proper consolidation and finishing. If the concrete has become so unworkable that it cannot be utilized, the truck load of concrete will be rejected, and the economic loss therefore will be assessed to either the supplier or the customer depending on the cause.

To alleviate the problem of rapid hardening in the form, additional chemicals, commonly referred to as chemical admixes, have been added to the concrete mixture. Although these chemical admixes are effective in altering the hardening time of the concrete in the form, they do not reduce the slump loss of the concrete under normal conditions during transportation. Indeed, some chemical admixes have the deleterious side effect of increasing the loss in the workability of the concrete during transit.

In an attempt to correct the slump loss of the concrete during shipment and to increase its workability, additional water is frequently added to the concrete at the point of use. Although this procedure does make the concrete somewhat more manageable, the addition of excess water reduces the strength of the concrete. Moreover, since it is difficult to mix the additional water throughout the truck load, the resulting concrete lacks homogeneity, which may result in a structure having localized areas of weakness or low compressive strength.

Thus, the prior art has failed to provide a method of preparing concrete containing a chemical admix without incurring the disadvantages associated therewith.

SUMMARY OF THE INVENTION

The present invention comprises an improved method for preparing concrete in which the chemical admix is slurried with water and a pozzolan material before it is mixed with the other concrete ingredients.

It is an object of this invention to provide an improved method for preparing concrete containing a chemical admix without incurring the deleterious side effects usually associated with the use of chemical admixes.

Specifically, it is an object of this invention to provide an improved method for preparing concrete containing a chemical admix without incurring the workability loss normally associated with the use of chemical admixes.

In addition, it is an object of this invention to provide a method for preparing concrete containing a chemical admix which offsets the workability loss normally associated with the use of such chemical admixes without significantly reducing the strength of the concrete.

DETAILED DESCRIPTION OF THE PREFERRED EMBODIMENTS

It has been found unexpectedly that the disadvantages associated with the use of a chemical admix in concrete can be avoided by using an aqueous slurry of pozzolan material as the vehicle for adding the chemical admix to the concrete mixture. Specifically, an improved process has been found for preparing cementitiious mixtures comprising water, cement, fine aggregate, chemical admix, and pozzolan wherein a substantial proportion of the chemical admix and pozzolan are slurried in water to form a pozzolan-admix slurry and the pozzolan-admix slurry is subsequently mixed with the other ingredients of the cementitious mixture.

The present invention is applicable to the preparation of concrete mixtures containing a chemical admix. Typical concrete mixtures comprise water, cement, fine aggregate and coarse aggregate. The cement utilized in the concrete of this invention may consist of any of the types (I-V) of portland cement defined in the American Society for Testing and Materials ("ASTM") Standard C 150-74 or mixtures thereof. Typically the fine aggregate comprises sand of the appropriate size distribution and the coarse aggregate comprises stone. The ingredients of concrete and their proportions are well known in the prior art. Although the description of the present invention frequently refers to concrete, it is to be understood that the invention is generally applicable to cementitious mixtures comprising water, cement, and fine aggregate in addition to chemical admix and fly ash, and is applicable to cementitious mixtures known in the art as mortar. The ingredients of contrete or mortar may be mixed in any manner desired, although to avoid undue mixing stress, it is preferable to add the ingredients simultaneously.

The present invention relates to such cementitious mixtures which additionally include chemical admixes. The basic types of chemical admixes are set forth in ASTM standard specification C 494-71 and are generally classified according to their function, i.e., whether they are utilized to retard or accelerate the cementitious chemical reactions, to reduce the water requirement, or for a combination of these reasons. The present invention is applicable to all types of chemical admixes, since they all possess the same deleterious side effects. In some instances it may be desirable to utilize more than one of these chemical admixes. The chemical admixes which are used frequently today include derivatives of lignosulfonic acid and its salts, hydroxylated carboxylic acids and their salts, and polymer derivatives of sugar.

The pozzolan materials, although not cementitious in themselves, contain constituents which will combine with lime at ordinary temperatures in the presence of water to form stable insoluble compounds possessing cementing properties. It is believed that the critical element in the pozzolan is an active silica which reacts with excess lime or calcium hydroxide liberated during the hydration of the cement. Pozzolan materials include pozzolana, trass, volcanic ash, pumice, slag, diatomaceous earth, siliceous clays, calcined shale, and fly ash. Fly ash is produced commercially as a finely divided product from the combustion of pulverized coal. Large amounts of fly ash are recovered annually in the United States by filtration or electrostatic precipitation from the stack gas of coal burning electrical generating plants. Normally, fly ash is added to replace an equal amount of cement in the concrete mixture. Typically, pozzolan or fly ash is utilized in an amount ranging from 10 to 50 percent by volume and preferably from 20 to 40 percent by volume of the original total volume of cement. Concrete mixtures prepared in accordance with this invention contain pozzolan or fly ash in these proportions.

In practicing the present invention a substantial proportion of the chemical admix is slurried with pozzolan in water to form a pozzolan-admix slurry and the pozzolan-admix slurry is subsequently mixed with the other ingredients of the cementitious mixture. Although it is desirable to preslurry all of the chemical admix and pozzolan material which are to be utilized in the cementitious mixture, the deleterious side effects of the chemical admix can be offset if approximately 50% or more of the chemical admix is preslurried with fly ash. Enough pozzolan should be incorporated in the pozzolan-admix slurry to represent at least 0.3 cubic feet of pozzolan per cubic yard of concrete produced. Additional pozzolan may be added to the concrete mixture in a conventional manner. Typically enough water is added so that the water comprises from 20 to 50 percent by weight, and, preferably, about 30 percent by weight of the slurry.

Typical concrete mixtures which can be formulated in accordance with this invention include the following:

Composition A:

Water — 186.1 cc  Cement — 453.5 grams

Pozzolan-Admix Slurry:

Fly ash — 86 grams
Admix — 2.95 cc Pozzolith 80
Water — 61 cc.
Sand — 1375 grams Composition B:

Water — 145.6 cc
Cement — 283.4 grams

Pozzolan-Admix Slurry:

Fly ash — 214 grams
Admix — 1.84 cc Pozzolith 80
Water — 102.6 cc
Sand — 1375 grams The water, pozzolan, and chemical admix should be mixed thoroughly so that all surfaces of the pozzolan are contacted and saturated by the slurry. The duration of the mixing is dependent, of course, on the efficiency of the mixer and the volume of material being mixed. However, it is generally sufficient if the slurry is vigorously mixed for a period of time between five seconds and one minute. Excessive mixing of the slurry results in additional water demand of the concrete. Immediately after the pozzolan has been saturated, the pozzolan-admix slurry can be added to and mixed with one or more of the other concrete ingredients. The remaining ingredients of the cementitious mixture may then be added and the cementitious mixture is then thoroughly mixed.

Any order of mixing the ingredients in the pozzolan-admix slurry can be utilized. For example, the pozzolan can be slurried first and the chemical admix added subsequently; the chemical admix can be slurried in water first and the pozzolan added later; or the pozzolan and chemical admix can be slurried separately, combined, and mixed. Although it is preferable to form the pozzolan-admix slurry physically separated from the other concrete ingredients, it is also possible to form the slurry in the presence of some of the other concrete ingredients, but prior to mixing. For example, it is possible to add the pozzolan material and water to a mixture of cement and water, add the chemical admix to the area where the pozzolan is located, and then mix all of the ingredients including the pozzolan-admix slurry. This latter procedure might be utilized, for example, in commercial ready-mixed concrete batching operations which do not have separate facilities to form the pozzolan-admix slurry independent of the other concrete ingredients.

The present method of preparing concrete containing a chemical admix is particularly advantageous in prolonging the workability of the concrete. The workability of a concrete mixture is generally defined by its slump. Typically, slump is measured by placing the concrete in an inverted conical container. The container is removed and the difference in height ("slump") is measured between the original height of the concrete in the cone and the height of the concrete mass after the cone is removed. The more workable the concrete, the more the conical pile will spread out and sag, and the greater will be its slump. By repeating this test at various intervals in time, it is possible to determine the change in its workability.

To counteract the workability loss associated with the use of chemical admixes, it is also helpful to add calcium chloride to the pozzolan-admix slurry. Calcium chloride may be added in any amount up to approximately 2.0 percent by weight of the cement employed in the concrete mixture and, preferably, from 1.0 to 2.0 percent by weight of the cement.

EXPERIMENTAL EVALUATIONS

Evaluation 1:

A series of tests were conducted to demonstrate the advantages of the present method of preparing concrete.

The tests were conducted utilizing a blend of equal portions of three Type I cements and performed in accordance with ASTM standard specification C 150. In the first test 500 grams of the cement blend were utilized without fly ash. In the remaining tests 400 grams of cement were utilized and 125 grams of fly ash were aded as described latter. This fly ash was recovered by electrostatic precipitation from the stack gas of an electric generating plant utilizing pulverized coal. This fly ash had a specific gravity of 2.38 and a fineness of 6990 sq. cm/cubic cm. Approximately 90% of the fly ash passed through a No. 200 sieve, an approximately 82% passed through a No. 325 sieve.

In each example 1375 grams of sand were utilized. This sand was obtained from Ottawa, Illinois, and was graded in accordance with paragraph 4 of ASTM specification standard C 109.

The chemical admix utilized in the tests was a typical product employed in the industry and sold under the name Pozzolith 80 by Master Builders Co. of Cleveland, Ohio. The active ingredient of Pozzolith 80 is the calcium salt of lignosulfonic acid, and the product has an approximate solids content of 40–45 percent by weight. Pozzolith 80 is recommended as both a Type B (retarding) and Type D (water-reducing and retarding) admix under ASTM specification standard C 494. The recommended minimum and maximum doses of this chemical admix are, respectively, 5 and 10 ounces of Pozzolith 80 per 100 pounds of cement.

To help offset the workability loss of the Pozzolith 80, calcium chloride was added to some of the examples, as described later. Since the exothermic dissolution of anhydrous calcium chloride has harmful effects on cement an aqueous solution containing 33 percent by weight calcium chloride was first formed from anhydrous calcium chloride before addition to the pozzolan-admix slurry or other concrete ingredients.

The various mortar samples which were prepared were subjected to two basic tests. The slump loss was measured utilizing a measuring cone as described in paragraph 2.3 of ASTM standard test C 128-73. Initially one-half of the cone was filled with the mortar and rodded 25 times with a rounded tip rod having a diameter of five-sixteenth inch. The remainder of the metallic cone was then filled and rodded 25 times again with the rod passing through the top layer and barely into the second in order to consolidate the two layers. Following the second rodding, excess mortar was struck from the top of the cone utilizing the edge of a trowel, and the cone was slowly removed during a ten second interval. The cone was placed beside the conical mass of mortar, and the difference between the heright of the standard cone (the original height of the mortar) and the height of the mortar after removal of the cone was then measured to determine the slump. All measurements were taken at the cross-sectional center of the conical mortar mass. Although the slump tests were performed on mortar (concrete minus coarse aggregate), rather than the concrete to avoid localized variations caused by large aggregate particles, additional experiments demonstrated a linear relationship between the slump of the cement mortar and that of concrete. Accordingly, the tests accurately reflect the workability of concrete prepared by the same methods as the various mortars prepared in this evaluation.

The other basic test was the measurement of entrained and entrapped air contained in the mortar. A metallic cylinder, closed on one end and having a known volume and weight, was utilized to determine the density of each mortar prepared. The cylinder was filled in three equal parts with subsequent rodding after each addition of mortar as in the slump test. Following the rodding of the third layer, the excess mortar was struck from the top and the density determined by dividing the volume of the cylinder by the difference in weight between the filled and unfilled cylinder. By knowing the total weight of the mortar produced in a given batch and the density, the total volume of mortar prepared could be computed. The volume of voids could be calculated by summing the total volume of the individual constituents in the mortar batch and subtracting it from the actual volume. The difference in volumes represented the amount of air which had become entrained or entrapped in the mortar during processing.

The mixing procedure utilized in each test was the basic procedure described in ASTM standard C 109 with a few modifications. First, a known amount of water along with a small amount of an air entraining agent, vinsol resin, were placed in a mixer similar to that specified in ASTM standard C 305-65. The amount of water utilized was varied in an attempt to obtain the same initial slump for batches with the same composition but prepared by different methods. Similarly, the amount of air entraining agent was adjusted to achieve, as nearly as possible, the same total volume of air comprised of both entrained and entrapped air, in analogous batches. Subsequently, the cement was added to the mixer and the cement and water were mixed on a slow speed for 30 seconds. If the fly ash was not preslurried, it was added to the mixer simultaneously with the cement. If the fly ash as preslurried, the pozzolan-admix slurry was added at the end of the 30 seconds of mixing. The mixer was permitted to run at the same speed for an additional thirty seconds while the sand was added and was then shifted to a medium speed for an additional thirty seconds. The mixer was turned off for 90 seconds, and during the first 15 seconds, the sides of the mixer were scraped down. The mortar was then mixed on the medium speed for an additional 60 seconds.

During the first minute and one-half after the final mixing, the bowl was removed from the mixer. One-half of the mortar was removed and measured for initial slump, the test taking approximately 30 to 45 seconds to perform. The remaining half was then tested to determine the percentage air. Following completion of these tests, both fractions were returned to the mixing bowl and were mixed for fifteen seconds at the medium speed. The slump and percentage air were again measured. The mortar was returned to the bowl one more time, mixed for 15 seconds at medium speed, and compacted into six standard 2-inch cubes for measurement of compressive strength. The cubes were cured using lime water under ASTM C 109 conditions. All tests were conducted under standard conditions of temperature and humidity specified in ASTM C 109.

The composition of the various samples, addition methods, and results are reported in Table I. "Max." admix means that 10 ounces of admix were added per 100 pounds of cement and "Min." admix means that 5 ounces of admix were added per 100 pounds of cement. The designation "early" means that the admix was added directly to the water prior to the addition of cement; the designation "late" means that the admix was added at some point after the addition of cement to the water. Unless otherwise noted, the chemical admix and the calcium chloride were added simultaneously. Similarly, unless otherwise noted, the fly ash was added without slurrying.

TABLE I

| Sample No. | Fly Ash (125 grams) | Admix | CaCl$_2$ wt % cement) | Addition Method | Initial Slump (1/16") | Second Slump (1/16") | Workability Loss (%) | Total Water (grams) | Net Water (grams) | Air (% Vol.) | Water/ Cement | 4-Day Compressive Strength (psi) |
|---|---|---|---|---|---|---|---|---|---|---|---|---|
| 1[1/] | 0 | 0 | 0 | N.A. | 10.0 | 9.0 | 10 | 279.5 | 271.4 | 7.1 | 0.559 | 3750 |
| 2 | Yes | 0 | 0 | N.A. | 10.0 | 8.0 | 20 | 260.0 | 248.8 | 8.3 | 0.460 | 2920 |
| 3 | Yes | Min. | 0 | Early | 10.5 | 7.8 | 33 | 256.0 | 246.5 | 8.1 | 0.447 | 2600 |
| 5 | Yes | Min. | 0 | Late | 11.0 | 7.5 | 31.8 | 255.5 | 247.5 | 7.6 | 0.452 | 2770 |
| 9[2/] | Yes | Min. | 0 | Late | 10.0 | 8.5 | 15.0 | 255.0 | 247.5 | 7.5 | 0.451 | 2640 |
| 4 | Yes | Max. | 0 | Early | 11.5 | 8.0 | 30.4 | 253.0 | 247.0 | 7.1 | 0.447 | 2680 |
| 6 | Yes | Max. | 0 | Late | 13.0 | 7.0 | 46.2 | 253.0 | 248.3 | 6.6 | 0.447 | 2820 |
| 7[3/] | Yes | Max. | 0 | Late | 10.0 | 8.0 | 20.0 | 249.0 | 243.8 | 7.3 | 0.440 | 2790 |
| 8[2/] | Yes | Max. | 0 | Late | 10.0 | 8.0 | 20.0 | 249.0 | 241.95 | 8.0 | 0.440 | 2780 |
| 13 | Yes | Max. | 2.0 | Early | 9.0 | 6.5 | 27.8 | 251.0 | 240.0 | 8.9 | 0.444 | 3790 |
| 14 | Yes | Max. | 2.0 | Late | 10.0 | 7.0 | 30.0 | 246.0 | 236.0 | 9.0 | 0.435 | 4040 |
| 11[4/] | Yes | Max. | 2.0 | Late | 8.0 | 7.0 | 12.5 | 243.0 | 231.8 | 9.8 | 0.430 | 4080 |
| 12[5/] | Yes | Max. | 2.0 | Late | 8.0 | 7.0 | 12.5 | 243.0 | 230.9 | 10.2 | 0.430 | 4370 |
| 10[4/] | Yes | Max. | 1.0 | Late | 8.5 | 8.0 | 5.9 | 245.0 | 237.1 | 8.5 | 0.433 | 3750 |

[1/]500 grams of cement were utilized in this sample, All other samples utilized only 400 grams of cement.
[2/]Fly ash was preslurried with water and admix.
[3/]Fly ash was preslurried with water and added to the cement and water mixture. The chemical admix was then added to the preslurried.
[4/]Fly ash was prewet with CaCl$_2$ and then slurried with water and admix.
[5/]Fly ash was preslurried with admix. CaCl$_2$ was then added to the slurry.

Table I contains the results of the initial and second slump measurements on each sample of mortar. The workability loss is the percentage difference between the first and second slump measurements. A larger workability loss represents a greater loss in slump during a given period of time and indicates that concrete prepared by that method loses its plasticity more rapidly.

Table I also shows the total water contained in each sample. The net water indicates the amount of water required to produce 1000 cc. of mortar of the same proportions. The air content shown in Table I is the second of the two measurements which were taken. The water/cement weight ratio is also given in Table I and includes as cement an equivalent of cement which was replaced by the volume of fly ash actually utilized. The compressive strength was determined in accordance with the procedure outlined in paragraph 8.6 of ASTM standard C-109.

The results reported in Table I indicate that the process of preslurrying the chemical admix with fly ash and water significantly reduces the workability loss of the mortar. The results also indicate that although the preslurrying method reduces the workability loss, there is no significant sacrifice in the strength of the mortar.

Evaluation 2:

A second series of tests were performed to determine the applicability of the present invention to hot cement. When a cement manufacturing plant is operating under maximum conditions and is low in inventory, the hot cement is frequently loaded directly onto a truck. It is not uncommon for the batch concrete operator to receive the cement at a temperature of 130° F. or more and to utilize it immediately in that condition. To simulate this condition the cement blend in each of three examples was heated to a temperature of 165° F. before being added to the mortar mixture. Various methods of adding the chemical admix and calcium chloride were used, and the samples evaluated in accordance with the procedures in Evaluation 1. The results are reported in Table II.

TABLE II

| Sample No. | Flyash (125 grams) | Admix | CaCl$_2$ (wt% cement) | Addition Method | Initial Slump (1/16") | Second Slump (1/16") | Workability Loss | Total Water (grams) | Net Water (grams) | Air (% vol.) | Water/ Cement |
|---|---|---|---|---|---|---|---|---|---|---|---|
| 15 | Yes | Max. | 2.0 | Early | 11.0 | 8.0 | 27.3 | 262.0 | 249.3 | 8.2 | 0.463 |
| 16 | Yes | Max. | 2.0 | Late | 12.0 | 8.5 | 29.2 | 263.0 | 251.4 | 7.7 | 0.465 |
| 17* | Yes | Max. | 2.0 | Late | 12.0 | 11.0 | 8.3 | 266.5 | 252.8 | 8.1 | 0.471 |

The results reported in Table II indicate that the present invention is equally applicable to the formation of concrete from hot cement. The preslurrying of the fly ash with the admix and calcium chloride resulted in a much smaller workability loss than that experienced with mortars of an identical composition prepared by conventional methods.

Evaluation 3:

The same procedure utilized in Evaluation 1 was followed with the exception that a chemical admix sold under the name Pozzolith 100XL by Master Builders Co. of Cleveland, Ohio, was employed. The active ingredient of this chemical admix is a sugar based polymer. It is a type D admix whose recommended minimum and maximum doses are, respectively, 3 and 5 ounces per 100 pounds of cement. Tests were performed with and without preslurrying of the admix and the results are reported in Table II. These results indicate a significant reduction in the workability loss utilizing the method of this invention.

TABLE III

| Sample No. | Flyash (125 grams) | Admix | CaCl$_2$ (wt% cement) | Addition Method | Initial Slump (1/16") | Second Slump (1/16") | Workability Loss | Total Water (grams) | Net Water (grams) | Air (% vol.) | Water/ Cement |
|---|---|---|---|---|---|---|---|---|---|---|---|
| 18 | Yes | Max. | 0 | Late | 14 | 9 | 35.7 | 250.0 | 243.7 | 7.6 | 0.4421 |
| 19* | Yes | Max. | 0 | Late | 13 | 11 | 15.4 | 245.0 | 237.0 | 8.7 | 0.4333 |

*The fly ash was preslurried with the admix and water.

I claim:

1. A process for the preparation of ready-mix concrete comprising the following ingredients, water, cement, fine aggregate, a pozzolan material, and a chemical admix selected from the group consisting of derivatives of lignosulfonic acid and its salts and polymer derivatives of sugar, comprising:
   preparing a pozzolan-admix slurry comprising a substantial portion of said chemical admix, pozzolan material, and water;
   mixing said pozzolan-admix slurry for a period of time between five seconds and one minute;
   adding said pozzolan-admix slurry to a mixture comprising one or more of the ingredients of said ready-mix concrete;
   adding the remaining ingredients of said ready-mix concrete; and
   mixing said ready-mix concrete.

2. A process for the preparation of ready-mix concrete comprising the following ingredients, water, cement, fine aggregate, a pozzolan material, and a chemical admix selected from the group consisting of derivatives of lignosulfonic acid and its salts and polymer derivatives of sugar, comprising:
   preparing a mixture comprising cement and water;
   adding a slurry of pozzolan material and water to said mixture comprising cement and water;
   adding a substantial portion of said chemical admix to said slurry of pozzolan material and water to form a pozzolan-admix slurry;
   mixing sai pozzolan-admix slurry for a period of time between five seconds and one minute;
   adding the remaining ingredients of said ready-mix concrete to said mixture comprising cement and water; and
   mixing said ready-mix concrete.

3. A process for the preparation of ready-mix concrete comprising the following ingredients, water, cement, fine aggregate, a pozzolan material, and a chemical admix selected from the group consisting of derivatives of lignosulfonic acid and its salts and polymer derivates of sugar, the improvement comprising:
   preparing a pozzolan-admix slurry comprising a substantial proportion of said chemical admix, pozzolan material, and water;
   mixing said pozzolan-admix slurry for a period of time between five seconds and one minute; and
   subsequently adding said pozzolan-admix slurry to a mixture comprising one or more of the other ingredients of said ready-mix concrete.

4. The process of claim 1 wherein said pozzolan-admix slurry is formed by slurrying said pozzolan material in water and subsequently adding a substantial proportion of said chemical admix.

5. The process of claim 1 wherein said pozzolan material is fly ash.

6. The process of claim 1 wherein said pozzolan material is fly ash and said chemical admix comprises a derivative of lignosulfonic acid or its salts.

7. The process of claim 1 wherein said pozzolan material is fly ash and said chemical admix comprises a polymer derivative of sugar.

8. The process of claim 1 wherein said pozzolan-admix slurry also comprises calcium chloride.

9. The process of claim 6 wherein said pozzolan-admix slurry also comprises calcium chloride.

10. The process of claim 1 wherein said pozzolan material is fly ash.

11. The process of claim 2 whereinn said pozzolan material is fly ash and said chemical admix comprises a derivative of lignosulfonic acid or its salts.

12. The process of claim 2 wherein said pozzolan material is fly ash and said chemical admix comprises a polymer derivative of sugar.

13. The process of claim 2 wherein said pozzolan-admix slurry also comprises calcium chloride.

14. The process of claim 11 wherein said pozzolan-admix slurry also comprises calcium chloride.

15. The process of claim 3 wherein said pozzolan-admix slurry is formed by slurrying said pozzolan material in water and subsequently adding a substantial proportion of said chemical admix.

16. The process of claim 3 wherein said pozzolan material is fly ash.

17. The process of claim 3 wherein said pozzolan material is fly ash and said chemical admix comprises a derivative of lignosulfonic acid or its salts.

18. The process of claim 3 wherein said pozzolan material is fly ash and said chemical admix comprises a polymer derivative of sugar.

19. The process of claim 3 wherein said pozzolan-admix slurry also comprises calcium chloride.

20. The process of claim 17 wherein said pozzolan-admix slurry also comprises calcium chloride.

* * * * *